US011044373B2

(12) United States Patent
Fujimori

(10) Patent No.: US 11,044,373 B2
(45) Date of Patent: *Jun. 22, 2021

(54) IMAGE FORMING APPARATUS AND IMAGE FORMING METHOD

(71) Applicant: TOSHIBA TEC KABUSHIKI KAISHA, Tokyo (JP)

(72) Inventor: Masahiko Fujimori, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,745

(22) Filed: Apr. 15, 2020

(65) Prior Publication Data

US 2020/0296239 A1  Sep. 17, 2020

Related U.S. Application Data

(63) Continuation of application No. 16/354,698, filed on Mar. 15, 2019, now Pat. No. 10,659,637.

(51) Int. Cl.
*H04N 1/00* (2006.01)
*G06F 3/0484* (2013.01)

(52) U.S. Cl.
CPC ..... *H04N 1/00588* (2013.01); *G06F 3/04847* (2013.01); *H04N 1/00384* (2013.01)

(58) Field of Classification Search
CPC ...... G06F 3/04847; G06F 3/12; G06F 40/103; H04N 1/00015; H04N 1/00018;
(Continued)

(56) References Cited

U.S. PATENT DOCUMENTS 3,872,433 A * 3/1975 Holmes ............... G06K 9/2054
382/175
5,606,429 A * 2/1997 Sheldon ............... H04N 1/0057
358/450
(Continued)

FOREIGN PATENT DOCUMENTS

JP  H04-188166 A  7/1992
JP  H11-305609 A  11/1999

OTHER PUBLICATIONS

Extended European Search Report dated Jul. 2, 2020, mailed in counterpart European Application No. 19210549.2, 6 pages.

*Primary Examiner* — Negussie Worku
(74) *Attorney, Agent, or Firm* — Kim & Stewart LLP

(57) ABSTRACT

According to an embodiment, an image forming apparatus, comprises a document feeder to feed a document page by page, a scanner to scan the document fed by the document feeder and generate image data of the document, a printing apparatus to print images on recording media. An interface is configured to receive print settings and a test printing command. A controller is configured to control the document feeder to feed pages of the document according to the print settings when the test printing command is received, acquire image data of the pages of the document fed by the document feeder, and control the printing apparatus to print images in a test printing. The images in the test printing comprising image data of the pages of the document fed by the document feeder.

20 Claims, 17 Drawing Sheets

(58) Field of Classification Search
CPC .......... H04N 1/00031; H04N 1/00047; H04N 1/0005; H04N 1/00384; H04N 1/00395; H04N 1/00482; H04N 1/00485; H04N 1/00588; H04N 1/2338; H04N 1/2369
USPC ................................................ 358/498, 1.15
See application file for complete search history.

(56) References Cited

U.S. PATENT DOCUMENTS

| | | |
|---|---|---|
| 6,775,022 B2 | 8/2004 | Noyes et al. |
| 9,809,408 B2 | 11/2017 | Maenishi et al. |
| 9,948,804 B2 | 4/2018 | Oba |
| 10,659,637 B1 * | 5/2020 | Fujimori ............ H04N 1/00384 |
| 2001/0012410 A1 | 8/2001 | Michiie et al. |
| 2002/0067502 A1 * | 6/2002 | Hansen ................ G06F 3/1241 358/1.15 |
| 2003/0184796 A1 * | 10/2003 | Kokubo ............ H04N 1/00244 358/1.15 |
| 2005/0105116 A1 | 5/2005 | Kobashi |
| 2006/0126120 A1 * | 6/2006 | Imafuku ............ H04N 1/00132 358/1.18 |
| 2006/0221863 A1 | 10/2006 | Ishimoto et al. |
| 2007/0165248 A1 | 7/2007 | Utsunomiya et al. |
| 2007/0291286 A1 | 12/2007 | Utsunomiya et al. |
| 2010/0245918 A1 * | 9/2010 | Nguyen ............ G06K 15/1849 358/1.17 |
| 2011/0229237 A1 | 9/2011 | Hayashi |
| 2011/0286021 A1 | 11/2011 | Hirasawa |
| 2012/0113470 A1 | 5/2012 | Atsumi et al. |
| 2015/0153985 A1 | 6/2015 | Fujinaga |

* cited by examiner

*FIG. 12*

THIRD PAGE

FIFTH PAGE

IMAGE FORMING APPARATUS AND IMAGE FORMING METHOD

CROSS-REFERENCE TO RELATED APPLICATION

This application is a continuation of U.S. patent application Ser. No. 16/354,698, filed on Mar. 15, 2019, the entire contents of which is incorporated herein by reference.

FIELD

Embodiments described herein relate generally to an image forming apparatus and an image forming method.

BACKGROUND

Graphics including photographs, graphs, etc. other than text may be included on the pages of a document. If density settings or the like of the graphics are not appropriate, clipped white levels may appear on an image or shadow blocks may appear on the image. Thus, an image forming apparatus having a function of test-printing a document comprising a plurality of pages has been proposed.

In this type of image forming apparatus, a first page or a single page designated by a user can be printed. The user can then set printing conditions such as density or color balance according to a result of the test printing.

However, since often the size of text is large or the percentage of blank space may be large on the first page of the document, it may be difficult to determine the appropriate printing settings for the document even if a test printing has been performed. In addition, it may also be difficult to determine printing settings even when one specific page is selected to be test printed by the user.

DESCRIPTION OF THE DRAWINGS

FIG. 12 is a view for describing aspects of a printing magnification.

DETAILED DESCRIPTION

According to one embodiment, an image forming apparatus, comprises a document feeder configured to feed a document page by page; a scanner configured to scan the document fed by the document feeder page by page and generate image data of the document; a printing apparatus configured to print images on recording media based on the image data; an interface configured to receive print settings and a test printing command; and a controller. The controller configured to control the document feeder to feed pages of the document according to the print settings when the test printing command is received, acquire image data of the pages of the document fed by the document feeder, and control the printing apparatus to print images in a test printing, the images in the test printing comprising image data of the pages of the document fed by the document feeder.

First Embodiment

Hereinafter, an image forming apparatus according to first embodiment will be described with reference to drawings. For purposes of relational description, an XYZ coordinate system is used as an example.

The image forming apparatus 10 according to the first embodiment is a multi-function peripheral (MFP) as an example and will be referred to in this context as an MFP 10. MFP 10 has a test printing function. The test printing function permits a confirming of a printing status. The MFP 10 can test-print a plurality of designated pages of a document compromising a plurality of pages. A user may then visually confirm the printing status, appropriately correct printing conditions such as printing density, printing magnification and color balance, and then prints all the pages of the document.

MFP

Figure 1:
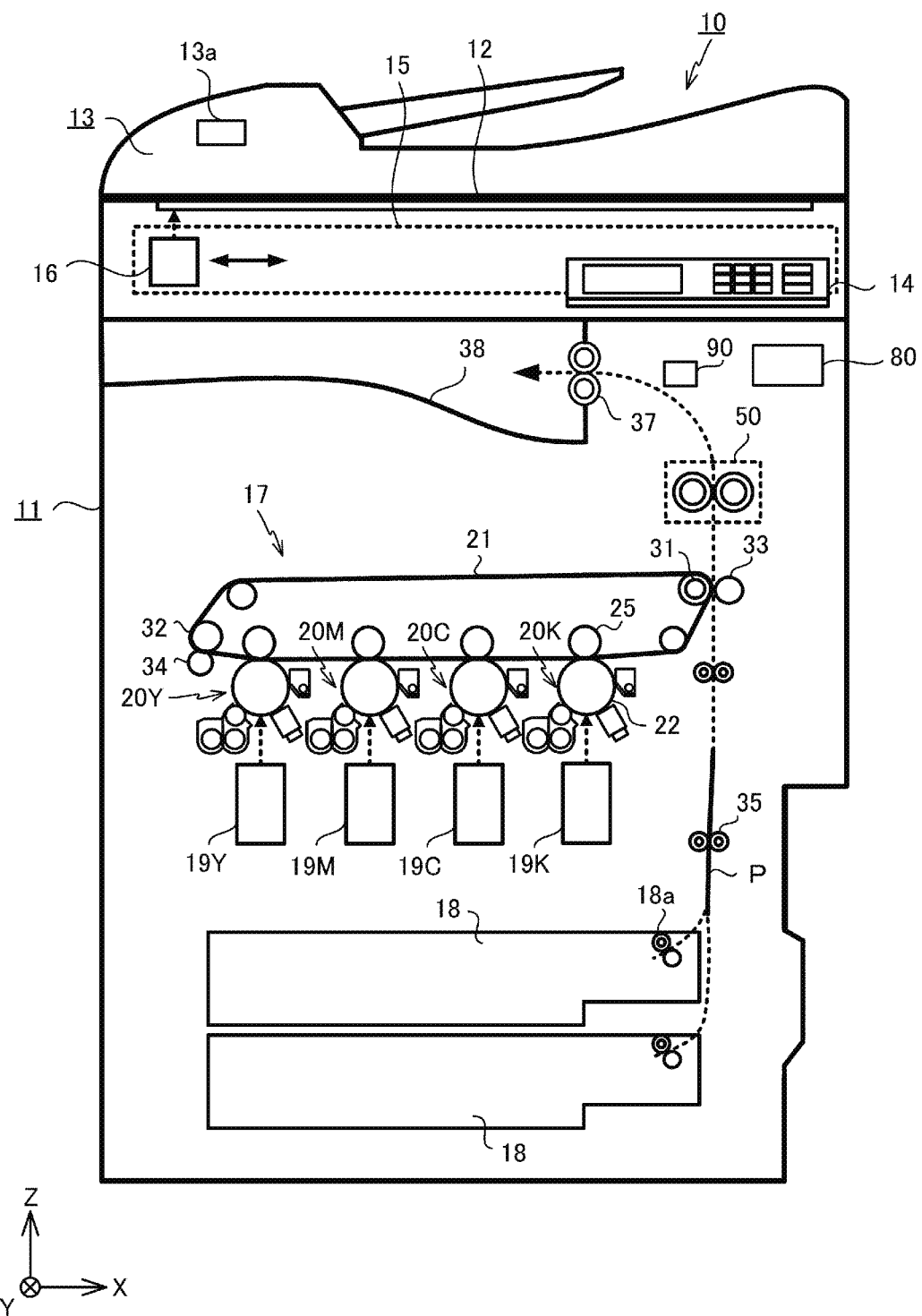
FIG. 1 depicts an image forming apparatus according to a first embodiment.

FIG. 1 is a view schematically illustrating the configuration of the MFP 10 according to the first embodiment. The MFP 10 includes a main body 11 and an auto document feeder (ADF) 13. A document platen 12 formed of transparent glass is disposed at an upper portion of the main body 11 and the auto document feeder (ADF) 13 is provided on the upper surface side of the document platen 12 in a hinged and rotatable manner. An operation panel 14 is provided at the upper portion of the main body 11. A scanner 15 for reading a document is provided below the document platen 12.

Figure 2:
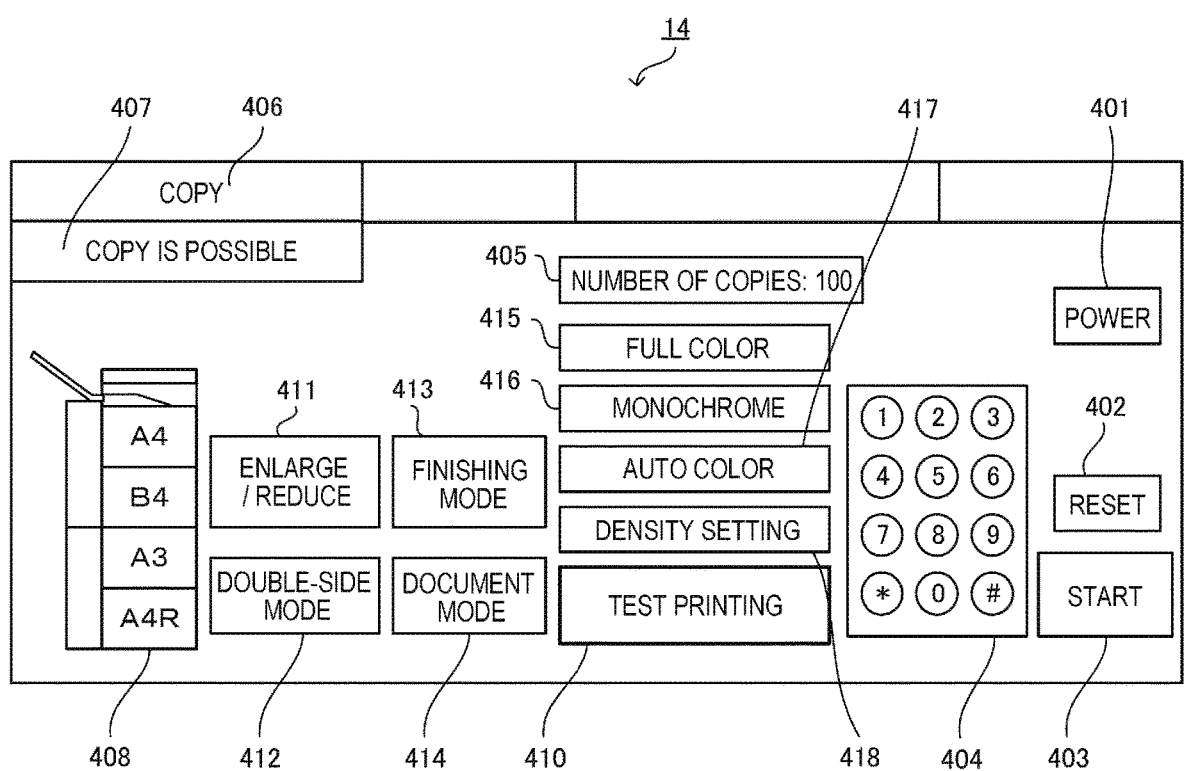
FIG. 2 depicts a GUI screen.

The operation panel 14 includes various input keys, buttons, a graphical user interface (GUI) or the like. FIG. 2 illustrates an example of a GUI screen displayed on the operation panel 14 including a touch panel to receive user input. As illustrated in FIG. 2, a power button 401, a reset button 402, a printing start button 403, a ten key 404, a field 405 for displaying the number of copies, a function display field 406, a mode display field 407, a FIG. 408 indicating the position of a paper feed cassette and the like are provided on the GUI screen of the operation panel 14.

In addition, various keys for setting the printing conditions are provided on the GUI screen. Specifically, a key 411 for setting an enlargement/reduction ratio, a key 412 for setting double-sided printing, a key 413 for setting a finishing mode (such as hole punching or stapling), a key 414 for selecting a document mode, a full color selection key 415, a black/white density selection key 416, an auto color selection key 417, a density setting selection key 418, and the like. In addition, a test printing key 410 is displayed on the GUI screen.

The auto document feeder 13 feeds a document that has a plurality of pages to the scanner 15 page by page. In addition, the auto document feeder 13 includes a counter 13a for counting the number of sheets of the conveyed and feeds the pages up to the page having the highest page number from among the plurality of page numbers of the pages designated by the user to be test-printed in a test printing.

For example, when page 5, page 10, page 20, and page 30 of a document are each designated as pages to be test-printed, the auto document feeder 13 feeds 30 pages of the document and then stop feeding of subsequent pages. If a range from page 1 to page 4 is designated as pages of the document to be test-printed, the auto document feeder 13 feeds the document up to the fourth page of the document and stops feeding.

The scanner 15 reads a document page fed by the ADF 13 or a document page placed on the document platen 12 and generates image data. The scanner 15 includes an image sensor 16.

The image sensor 16 reads the image of the document page while moving along the document platen 12 in a +X direction, when the image of the document page placed on the document platen 12 is being read. In addition, when the image of the document page fed to the document platen 12 by the auto document feeder 13 is being read, the image sensor 16 is maintained at a fixed position, which is illustrated in FIG. 1, to read images of each page of the sequentially fed document pages.

The main body 11 includes an image forming unit 17, a fixing apparatus 50, and a control device 80.

Image Forming Unit

The image forming unit 17 is disposed inside the main body 11. The image forming unit 17 forms an image on a recording medium, such as paper from a paper feed cassette 18, based on the image data as read by the scanner 15 or otherwise image data created by a personal computer or the like.

The image forming unit 17 includes image forming units 20Y, 20M, 20C and 20K for forming latent images using toners of yellow (Y), magenta (M), cyan (C) and black (K), scanning heads 19Y, 19M, 19C and 19K provided in correspondence with the image forming units 20Y, 20M, 20C and 20K, an intermediate transfer belt 21 and the like.

The image forming units 20Y, 20M, 20C and 20K are disposed below the intermediate transfer belt 21. In the image forming unit 17, the image forming units 20Y, 20M, 20C and 20K are arranged from the −X side to the +X side. The scanning heads 19Y, 19M, 19C and 19K are disposed below the image forming units 20Y, 20M, 20C and 20K, respectively.

Figure 3:
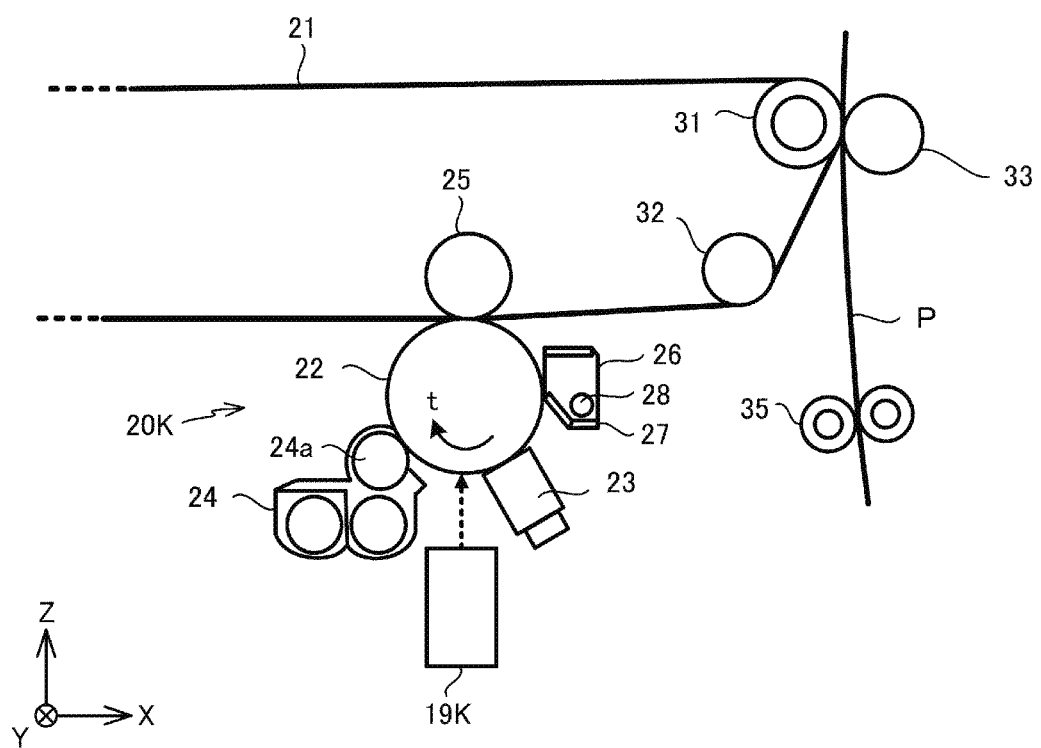
FIG. 3 depicts an image forming unit.

FIG. 3 is an enlarged view of the image forming unit 20K from among the image forming units 20Y, 20M, 20C and 20K. The image forming units 20Y, 20M, 20C and 20K have the same configuration. Therefore, the configuration of each image forming unit will be described using the image forming unit 20K as a representative example.

The image forming unit 20K includes a photosensitive drum 22 as an image carrier. A charger 23, a developing device 24, a primary transfer roller 25, a cleaner 26 are disposed around the photosensitive drum 22 in the direction indicated by arrow t. Laser light from the scanning head 19K is used to expose the photosensitive drum 22. By irradiating laser light on the surface of the rotating photosensitive drum 22, a latent image is formed on the surface of the photosensitive drum 22.

The charger 23 of the image forming unit 20K uniformly charges the surface of the photosensitive drum 22. The developing device 24 supplies a toner to the photosensitive drum 22 using a developing roller 24a, to which a developing bias is applied, and develops an electrostatic latent image. The cleaner 26 removes the toner remaining on the surface of the photosensitive drum 22 using a blade 27. The toner scraped off by the front end of the blade 27 is conveyed by an auger 28 in a longitudinal direction.

As illustrated in FIG. 1, the intermediate transfer belt 21 is stretched over a drive roller 31 and three driven rollers 32. The intermediate transfer belt 21 rotates in a counterclockwise direction in FIG. 1 by rotation of the drive roller 31. In addition, as illustrated in FIG. 1, the intermediate transfer belt 21 is in contact with the upper surfaces of the photosensitive drums 22 of each of the image forming units 20Y, 20M, 20C and 20K. A primary transfer voltage is applied by the primary transfer roller 25 at a position facing the photosensitive drum 22 of the intermediate transfer belt 21. Therefore, a toner image developed on the surface of the photosensitive drum 22 is transferred onto the intermediate transfer belt 21, which is referred to as a primary transfer.

A secondary transfer roller 33 is disposed to face the drive roller 31, over which the intermediate transfer belt 21 is stretched. When paper P passes between the drive roller 31 and the secondary transfer roller 33, a secondary transfer voltage is applied to the paper P by the secondary transfer roller 33. Therefore, a toner image formed on the intermediate transfer belt 21 is transferred onto the paper P, which is referred to as a secondary transfer. As illustrated in FIG. 1, a belt cleaner 34 is provided near the driven roller 32 of the intermediate transfer belt 21. The toner remaining on the surface of the intermediate transfer belt 21 after the secondary transfer is removed by the belt cleaner 34.

As illustrated in FIG. 1, a paper feed roller 35 is provided between a paper feed cassette 18 and the secondary transfer roller 33. The paper P taken from the paper feed cassette 18 by a pickup roller 18a provided near the paper feed cassette 18 is conveyed between the intermediate transfer belt 21 and the secondary transfer roller 33 by the paper feed roller 35.

The fixing apparatus 50 is provided above the secondary transfer roller 33. In addition, a paper discharge roller 37 is provided above the fixing apparatus 50. The paper P passing through the intermediate transfer belt 21 and the secondary transfer roller 33 is heated by the fixing apparatus 50. Therefore, a toner image is fixed to the paper P. The paper P passing through the fixing apparatus 50 is discharged to a paper discharge part 38 via the paper discharge roller 37.

Fixing Apparatus

Figure 4:
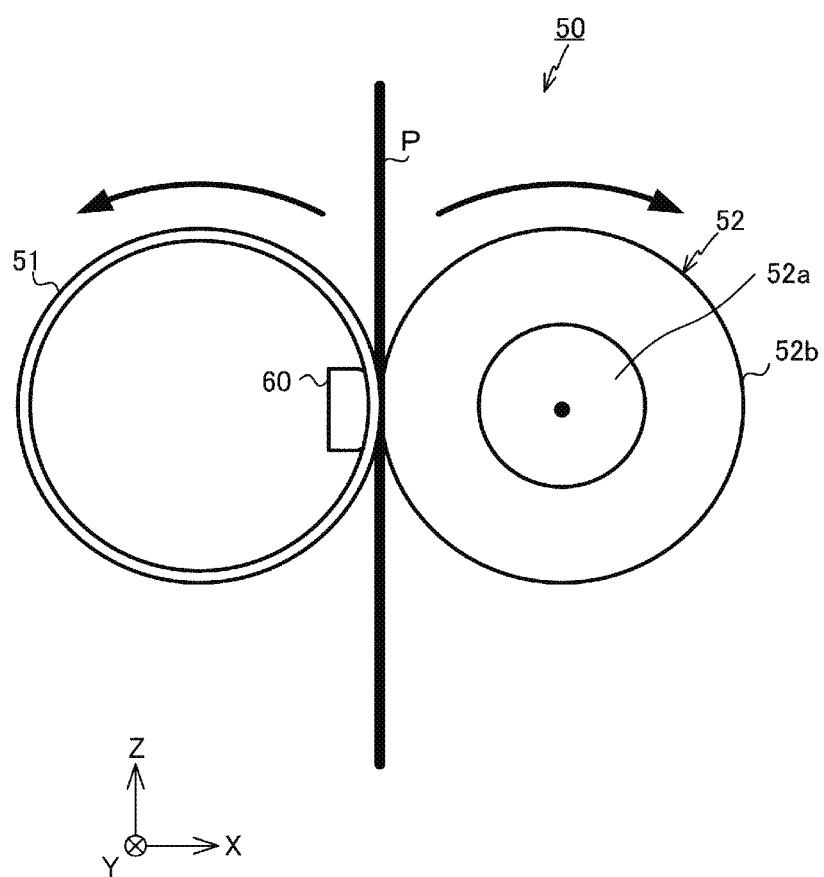
FIG. 4 depicts a fixing apparatus.

FIG. 4 is a view illustrating an example of the fixing apparatus 50. The fixing apparatus 50 includes a fixing belt 51, a pressure roller 52, and a heater 60. The heater 60 is provided on an inner surface of the fixing belt 51. The fixing belt 51 heated by the heater 60 is a heating rotator for heating the paper P.

The fixing belt 51 is a cylindrical member extending in a longitudinal direction along a Y-axis direction, and has a length (the dimension in the Y-axis direction) that is greater than a width (dimension in the Y-axis as being conveyed along the conveyance path) of the paper P. The fixing belt 51 is made of, for example, a film of SUS (stainless steel) having a thickness 50 μm or a heat-resistant polyimide film having a thickness of 70 μm as a base material. A silicone rubber layer having a thickness 200 μm is formed on the surface of the base material. In addition, the silicone rubber layer is covered with a surface protective layer made of PFA resin (perfluoroalkoxy resin) or the like. The fixing belt 51 is supported to be rotatable about an axis parallel to the Y-axis.

The pressure roller 52 is a cylindrical member having a longitudinal direction as a Y-axis direction. The pressure roller 52 includes a core material 52a made of metal, such as aluminum, and a silicone rubber layer 52b laminated on the outer circumferential surface of the core material 52a. The surface of the silicone rubber layer 52b is covered with PFA resin or the like. The pressure roller 52 has an outer diameter of about 25 mm and has the substantially same length (Y-direction axis) as the fixing belt 51. The pressure roller 52 is pressed in a direction (−X direction) toward the fixing belt 51. Therefore, the pressure roller 52 is pressed against the heater 60 with the fixing belt 51 therebetween. Accordingly, the surface of the pressure roller 52 and the surface of the fixing belt 51 are brought into tight contact with each other and form a nip through which the paper P passes from the lower side to the upper side (+Z direction).

In this fixing apparatus 50, the paper P passes through the nip between the pressure roller 52 and the fixing belt 51, each respectively rotating in the directions indicated by different arrows in FIG. 4 by the rotation of the pressure roller 52. Therefore, the paper P is heated and pressed and the toner image formed on the paper P is fixed to the paper P.

Control Device

Figure 5:
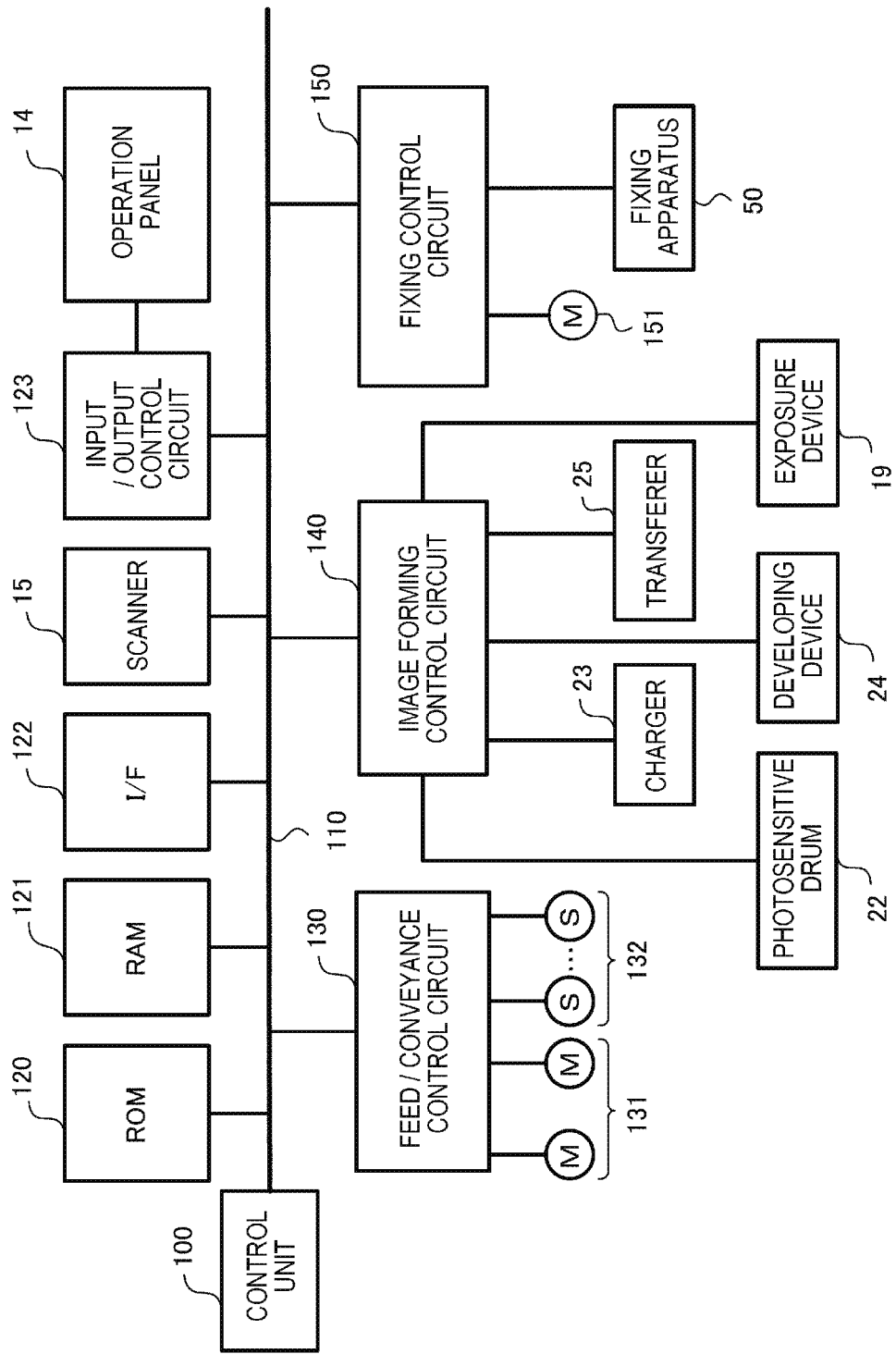
FIG. 5 is a block diagram of a control system for an image forming apparatus.

FIG. 5 is a block diagram of a control system for the MFP 10. The control system includes, for example, a control unit 100 (controller) for performing overall control of the MFP 10, a bus line 110, a read only memory (ROM) 120, a random access memory (RAM) 121, an interface 122, the scanner 15, an input/output control circuit 123, a feed/conveyance control circuit 130, an image forming control circuit 140 and a fixing control circuit 150. The control unit 100 and each circuit are connected through the bus line 110. The control device 80 includes the control unit 100, the bus line 110, the ROM 120, the RAM 121, the input/output control circuit 123, the feed/conveyance control circuit 130, the image forming control circuit 140 and the fixing control circuit 150.

The ROM 120 stores a control program, control data, and the like for the basic operations of the MFP 10.

The RAM 121 functions as a working memory/area of the control unit 100.

The control unit 100 includes a CPU, for example. The control unit 100 executes a program stored in the ROM 120 or the like. Therefore, the various components of the MFP 10 are controlled by the control unit 100 and the process of forming an image on the paper is executed. In addition, when a test printing command is received, the control unit 100 performs control to feed sheets of document (as a sub-portion of the document) from the auto document feeder 13 according to the content of a printing condition setting command, then acquires image data and controls the main body 11 to test-print an image based on the acquired image data on the fed paper P.

The interface 122 receives a printing condition command and a test printing command. The interface 122 communicates with a device such as an external terminal used by a user. The interface 122 includes a wireless communication unit (such as a wireless LAN), a wired communication unit, a communication unit for accessing a removable data recording medium such as a universal serial bus (USB) memory device or the like.

The input/output control circuit 123 displays necessary information on the operation panel 14 or receives input from the operation panel 14. The user can designate, for example, printing conditions such as the number of copies of a document to be made, printing density, and the like, by manipulating the operation panel 14.

The feed/conveyance control circuit 130 is a unit for controlling a motor group 131 for driving the pickup roller 18a, the paper feed roller 35, and the paper discharge roller 37 of a paper P conveyance path. The feed/conveyance control circuit 130 controls the motor group 131 according to the detection result of various types of sensors 132 provided near the paper feed cassette 18, or otherwise provided on the conveyance path, based on a control signal from the control unit 100.

The image forming control circuit 140 controls the photosensitive drums 22, the chargers 23, the scanning heads 19Y, 19M, 19C and 19K, the developing devices 24 and the primary transfer rollers 25 based on the control signal from the control unit 100 corresponding to the printing conditions as set.

The fixing control circuit 150 controls a drive motor 151 for rotating the pressure roller 52 of the fixing apparatus 50 based on the control signal from the control unit 100.

Image Forming Process

In the MFP 10, an image forming process for printing on paper P according to a printing command from the user is performed. The image forming process is performed, for example, when image data received through the interface 122 is to be printed or when image data generated by the scanner 15 is to be printed.

In the image forming process, as illustrated in FIG. 1, the paper P is taken out from the paper feed cassette 18 by the pickup roller 18a and is conveyed by the paper feed roller 35 between the intermediate transfer belt 21 and the secondary transfer roller 33.

In parallel with the above operations, toner images are respectively formed on the photosensitive drums 22 of the image forming units 20Y, 20M, 20C and 20K. The toner images formed on the photosensitive drums 22 of the image forming units 20Y, 20M, 20C and 20K are sequentially transferred onto the intermediate transfer belt 21. Therefore, a toner image of yellow (Y), a toner image of magenta (M), a toner image of cyan (C) and a toner image of black (K) are all formed on the intermediate transfer belt 21.

When the paper P conveyed between the intermediate transfer belt 21 and the secondary transfer roller 33 passes through the intermediate transfer belt 21 and the secondary transfer roller 33, toner images formed on the intermediate transfer belt 21 are transferred onto the paper P. Therefore, a toner image formed by the toners of yellow (Y), magenta (M), cyan (C) and black (K) is transferred to the paper P.

The paper P, on which the toner image has been formed, passes through the fixing apparatus 50. The paper P is heated and pressed by passing through the fixing apparatus 50. Therefore, the toner image is fixed to the paper P and the image is printed on the paper P. The paper P is then discharged to the paper discharge part 38 via the paper discharge roller 37.

Test Printing

Next, test printing of the MFP 10 will be described. The paper P is set in the paper feed cassette 18 in advance. A GUI screen illustrated in FIG. 2 is displayed on the operation panel 14. The user presses a "test printing" key 410 illustrated in FIG. 2, thereby starting the test printing.

Figure 6:
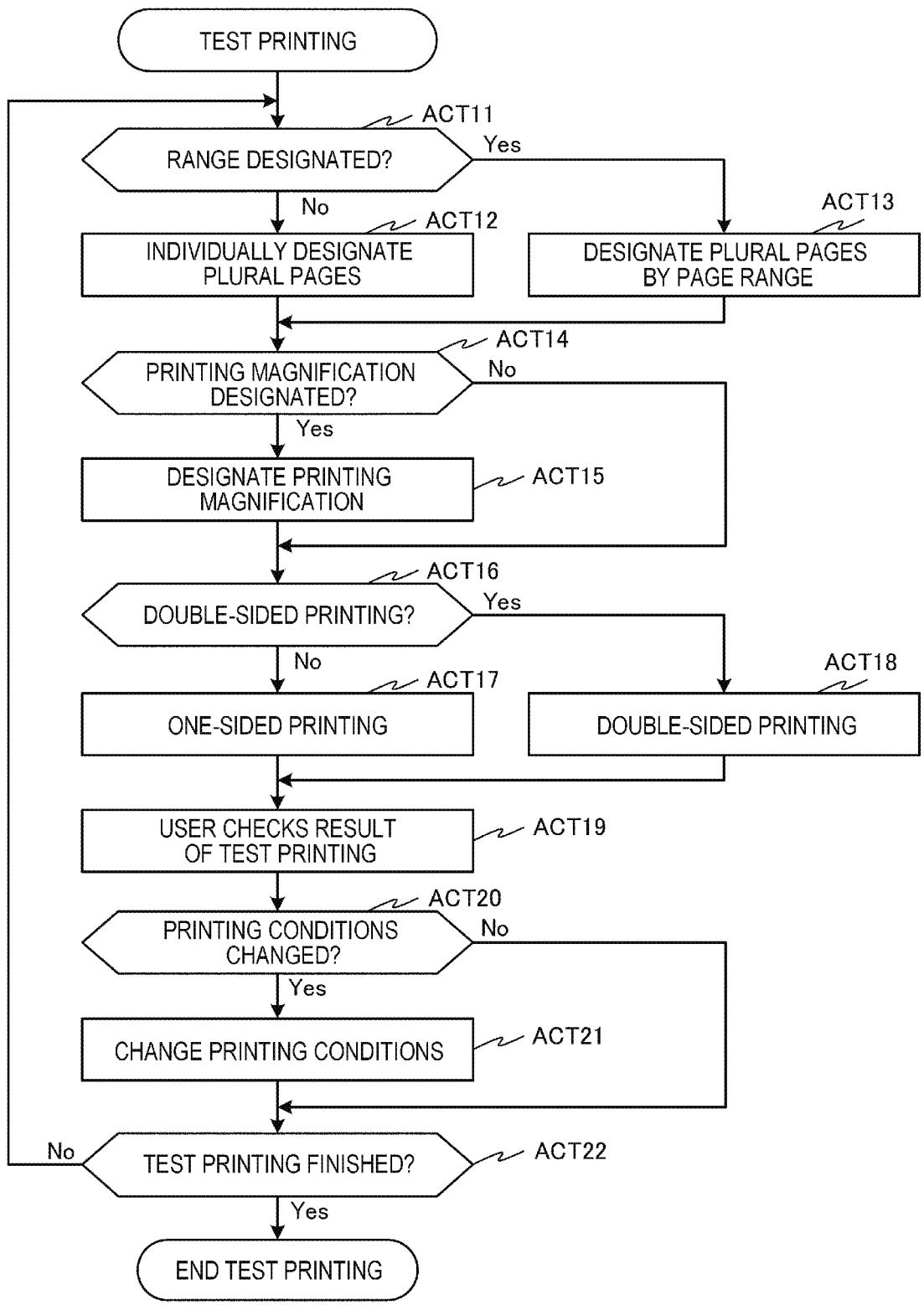
FIG. 6 is a flowchart for describing aspects of a test printing.
Figure 7:
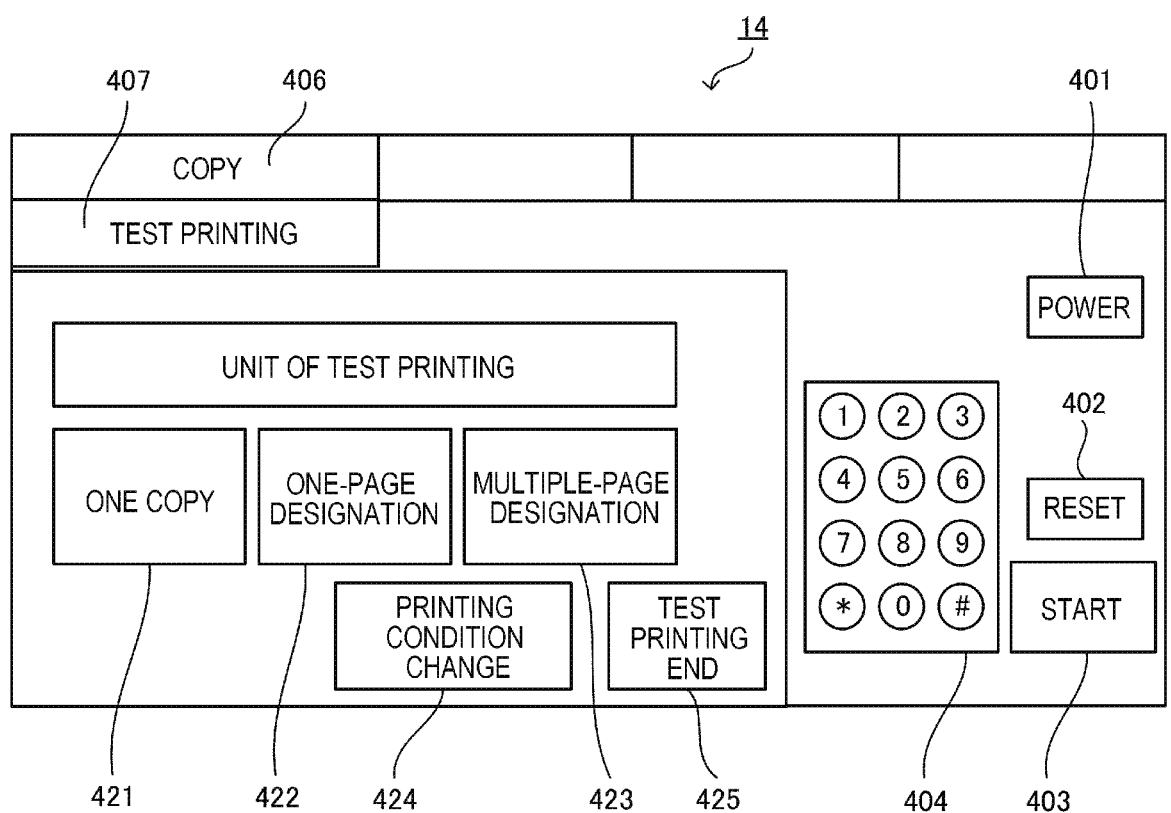
FIGS. 7 to 11 are views for describing aspects of a GUI screen.

When the "test printing" key 410 is pressed, the control unit 100 then displays the GUI screen illustrated in FIG. 7 on the operation panel 14. As illustrated in FIG. 7, a screen for selecting a unit of test printing is displayed on the GUI screen. Specifically, a "one copy" key 421, a "one-page designation" key 422, and a "multiple-page designation" key 423 are displayed. The "one copy" key 421 is a key for selecting a test-printing mode having all pages in the document test-printed. The "one-page designation" key 422 is a key for selecting a test-printing mode in which one designated page of the document is test-printed. The "multiple-page designation" key 423 is a key for selecting a test-printing mode in which a plurality of pages of the document are designated to be test-printed. The case where the "multiple-page designation" key 423 is selected will be described in detail with reference to the flowchart illustrated in FIG. 6.

As illustrated in FIG. 7, a "printing condition change" key 424 and a "test printing end" key 425 are also displayed on the GUI screen. If the "printing condition change" key 424 is pressed, the control unit 100 causes the process to transition to ACT 21 see (FIG. 6) and displays the GUI screen illustrated in FIG. 15 on the operation panel 14 without performing a test printing. In addition, if the "test printing end" key 425 is pressed, the control unit 100 ends test printing and again displays the GUI screen illustrated in FIG. 2 on the operation panel 14.

Figure 8:
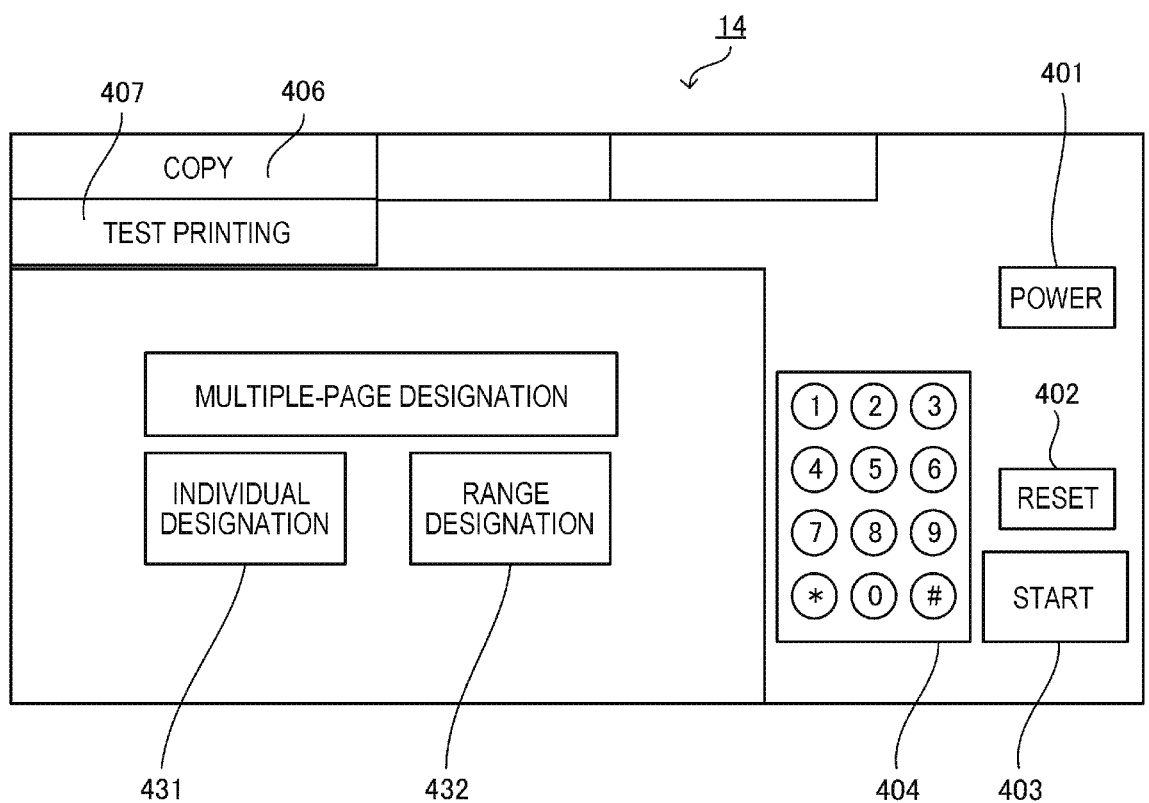

If the "multiple-page designation" key 423 is pressed, the control unit 100 displays the GUI screen illustrated in FIG. 8 on the operation panel 14. As illustrated in FIG. 8, a screen for selecting the method of designating page numbers of the document to be test-printed is displayed on the GUI screen. Specifically, an "individual designation" key 431 and a "range designation" key 432 are displayed. The "individual designation" key 431 is for selecting a mode for designating a plurality of pages to be test-printed using a specific page number or page numbers. The "range designation" key 432 is for selecting a mode for designating a plurality of pages to be test-printed using a page range.

Figure 9:
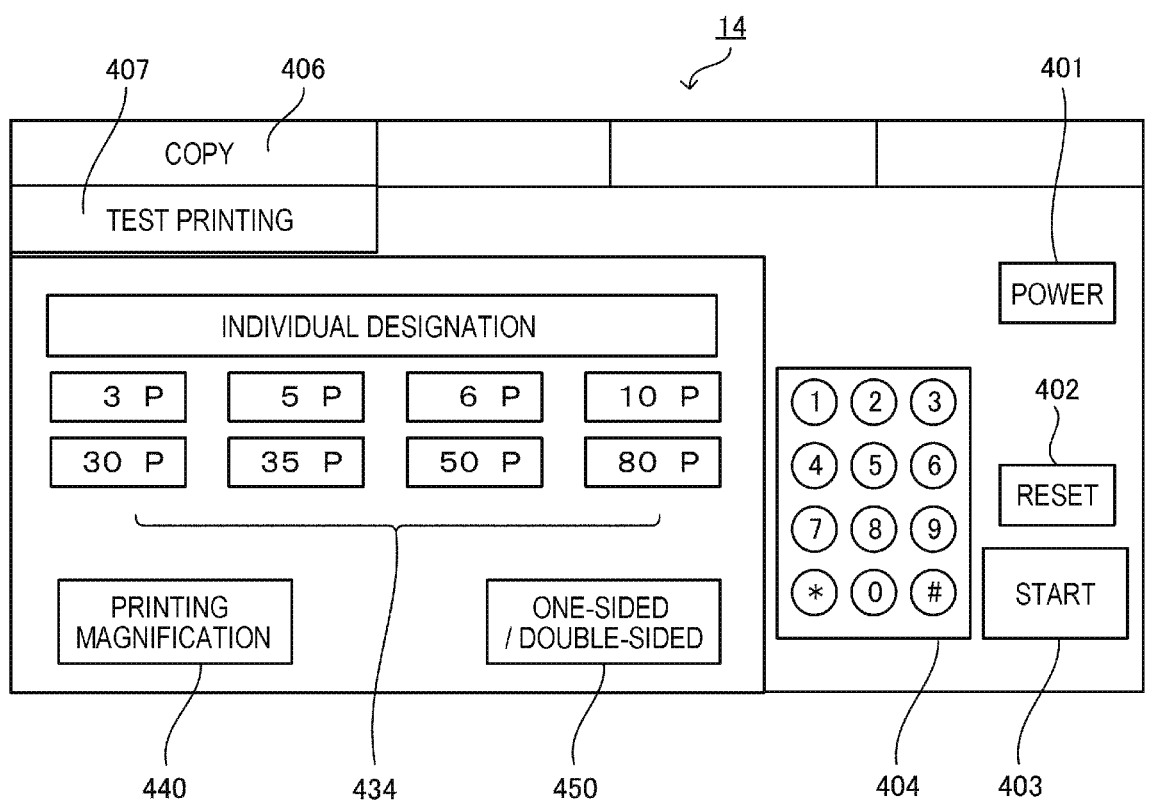

When the "individual designation" key 431 is pressed (ACT 11: No), the control unit 100 displays the GUI screen illustrated in FIG. 9 on the operation panel 14. As illustrated in FIG. 9, a page designation field 434 for designating the page numbers to be test-printed is displayed on the GUI screen. Here, the case where eight page numbers are to be designated for test printing will be described. The user inputs the page numbers of the pages to be test-printed using the ten key 404 (ACT 12). For example, the user inputs the designated page number "3" and signals an input decision using the key "#". Next, the user inputs "5 #", "6 #" and so forth up to eight total selections. The selected page numbers of the document as designated by the user are displayed in the page designation field 434 (3 P, 5 P, 6 P, 10 P, 30 P, 35 P, 50 P, 80 P).

When input of the page numbers to be test-printed is finished, the user next selects a "printing magnification" key 440 or a "one-sided/double-sided" key 450. When the "printing magnification" key 440 is pressed, the control unit 100 causes the process to transition to ACT 14. When the "one-sided/double-sided" key 450 is pressed, the control unit 100 causes the process to transition to ACT 16.

Figure 10:
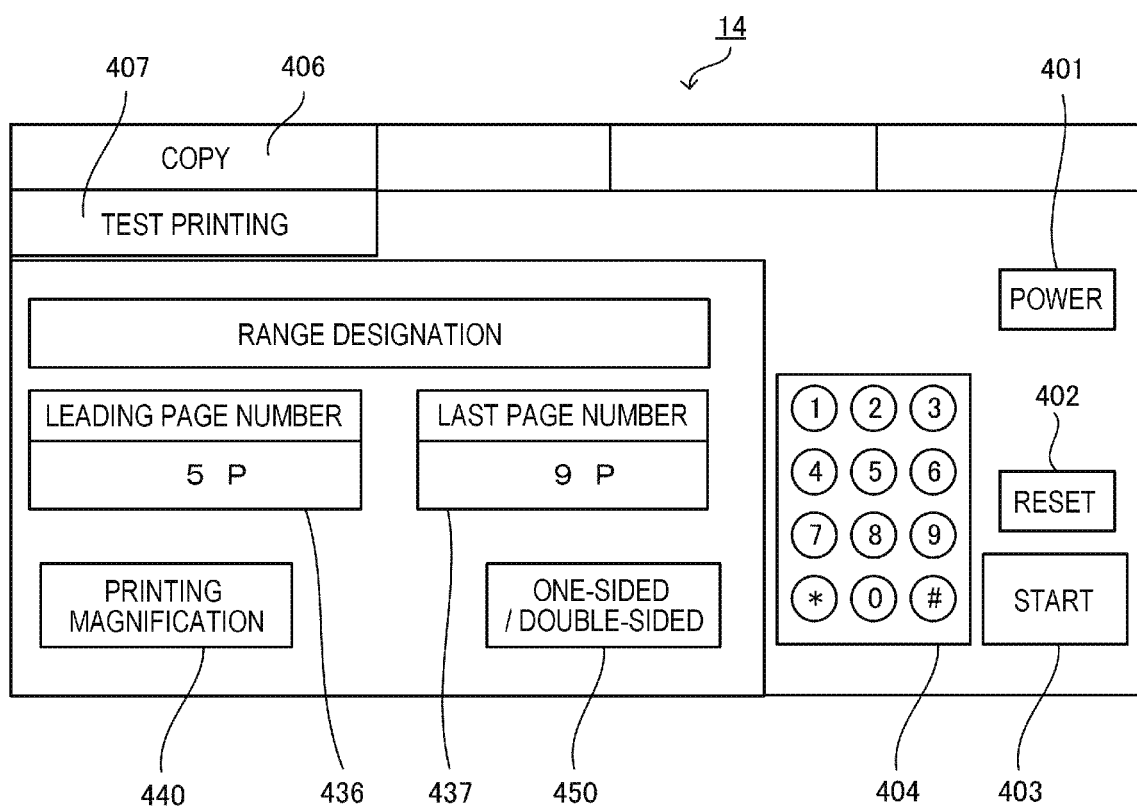

If the "range designation" key 432 is pressed (ACT 11: Yes) on the GUI screen of FIG. 8, the control unit 100 displays the GUI screen illustrated in FIG. 10 on the operation panel 14. As illustrated in FIG. 10, a leading page number display field 436 for the test printing and a last page number display field 437 of the test printing are displayed on the GUI screen. The user inputs a page range to be test-printed using the ten key 404 (ACT 13). For example, when page 5 to page 9 are to be designated, the user inputs "5", "#", "9" and "#", thereby selecting the page range (page 5 to page 9, inclusive). The page numbers of the document as designated by the user are displayed in the leading page number display field 436 and the last page number display field 437.

Figure 11:
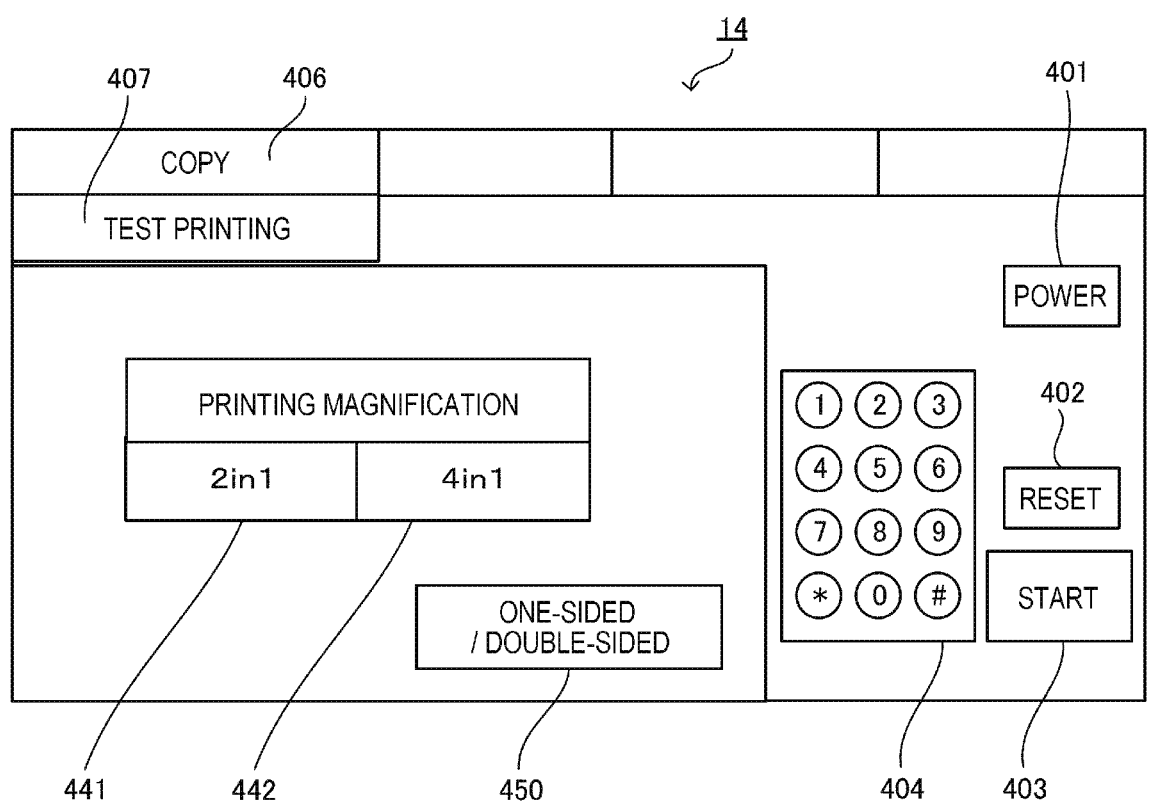
Figure 12:
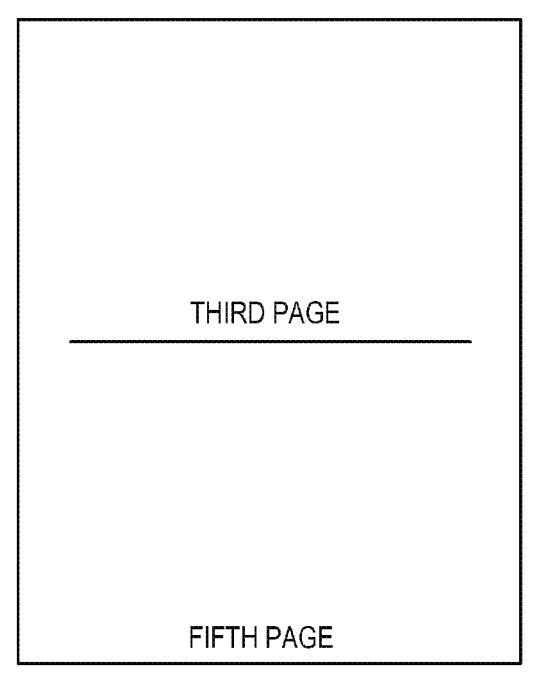
Figure 13:
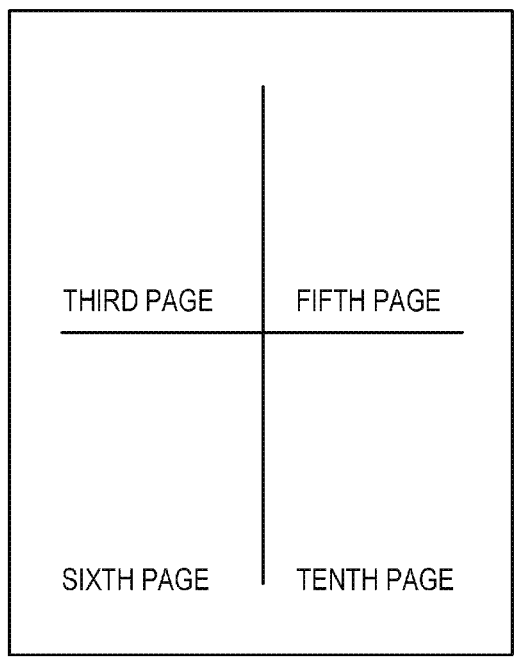
FIG. 13 is a view for describing aspects of a printing magnification.

Next, the case where the "printing magnification" key 440 is pressed will be described. When the "printing magnification" key 440 is pressed (ACT 14: Yes), the control unit 100 displays the GUI screen illustrated in FIG. 11 on the operation panel 14. As illustrated in FIG. 11, a "2in1" key 441 and a "4in1" key 442 are displayed on the GUI screen. The "2in1" key 441 is a key for selecting a mode in which printing of two pages of the document on a single sheet of the paper P is performed as illustrated in FIG. 12. That is, the document page size is set to 70% original size and printed. The "4in1" key 441 is a key for selecting a mode for printing four pages of the document on one page of the paper P as illustrated in FIG. 13. That is, the document is set to 50% original size and printed. When the "2in1" key 441 or the "4in1" key 442 is pressed (ACT 14: Yes), the control unit 100 receives an instruction for the printing magnification designated by the user (ACT 15). In addition, when the user does not select the "printing magnification" key 440 (ACT 14: No), the control unit 100 sets 100% (the same size) as printing magnification.

Figure 14:
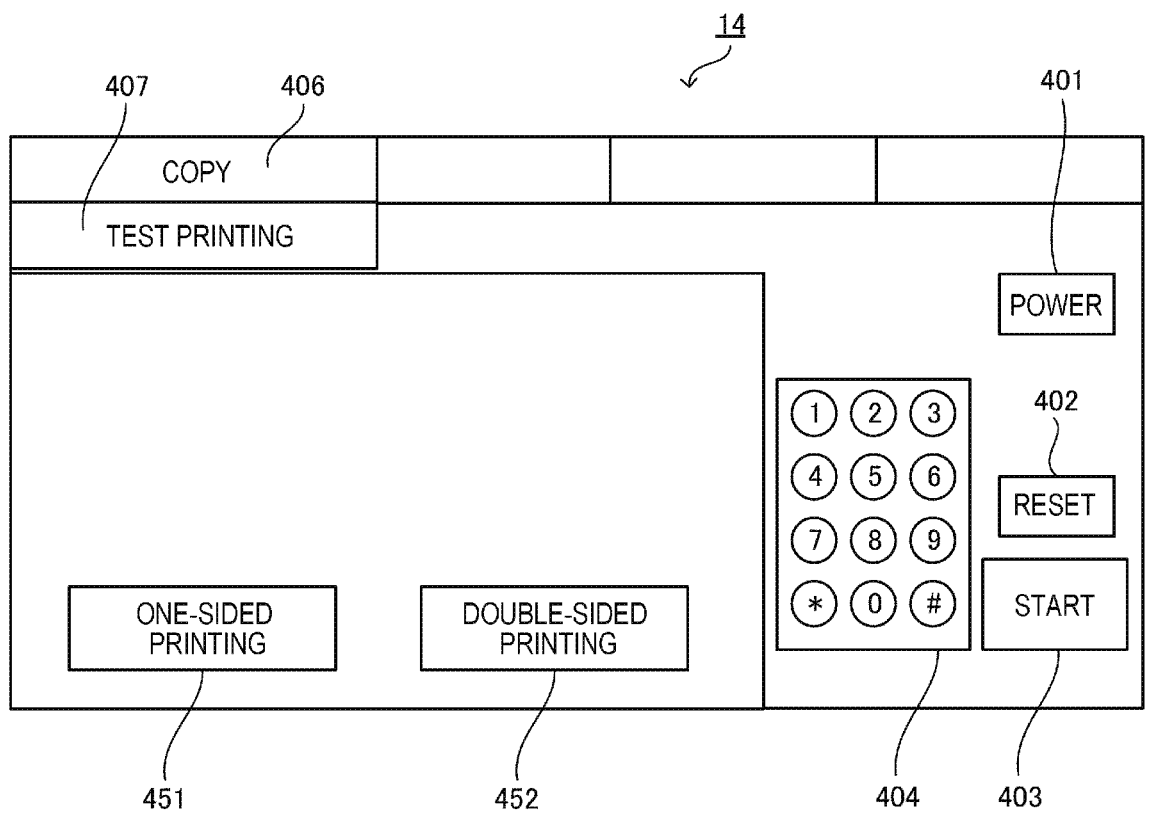
FIGS. 14 to 16 are views for describing aspects of a GUI screen.

Next, the case where the "one-sided/double-sided" key 450 is pressed will be described. If the "one-sided/double-sided" key 450 is pressed, the control unit 100 displays the GUI screen illustrated in FIG. 14 on the operation panel 14. As illustrated in FIG. 14, a "one-sided printing" key 451 and a "double-sided printing" key 452 are displayed on the GUI screen. If the user selects the "one-sided printing" key 451 (ACT 16: No), the control unit 100 performs test-printing on only one side of the paper P (ACT 17). For example, if the test printing range is 4 pages and the "2in1" key 441 is selected, two sheets of paper P are used for the test printing. If the user selects the "double-sided printing" key 452 (ACT 16: Yes), the control unit 100 performs test printing on both sides of the paper P (ACT 18). For example, when the test printing range is 4 pages and a "2in1" key 441 is selected, a single sheet of paper P (printed on both sides) is used for the test printing.

In the process of ACT 17 and ACT 18, the control unit 100 feeds the document from the auto document feeder 13 up to the page having a largest page number among the plurality of page numbers designated by the user to be test-printed and then stops feeding of the document. For example, when the total number of pages of the document is 100 pages and the largest page number among the plurality of page numbers designated by the user to be test-printed is page 9, the control unit 100 controls the auto document feeder 13 to feed the document up to the ninth page. The control unit 100 controls the auto document feeder 13 to feed the document corresponding to the page numbers or the page range acquired in ACT 12 or ACT 13 and to acquire image data, and controls the image forming unit 17 to print an image based on the image data on to the paper P. When test printing of the designated pages is finished, the control unit 100 displays the GUI screen illustrated in FIG. 7 on the operation panel 14.

Figure 15:
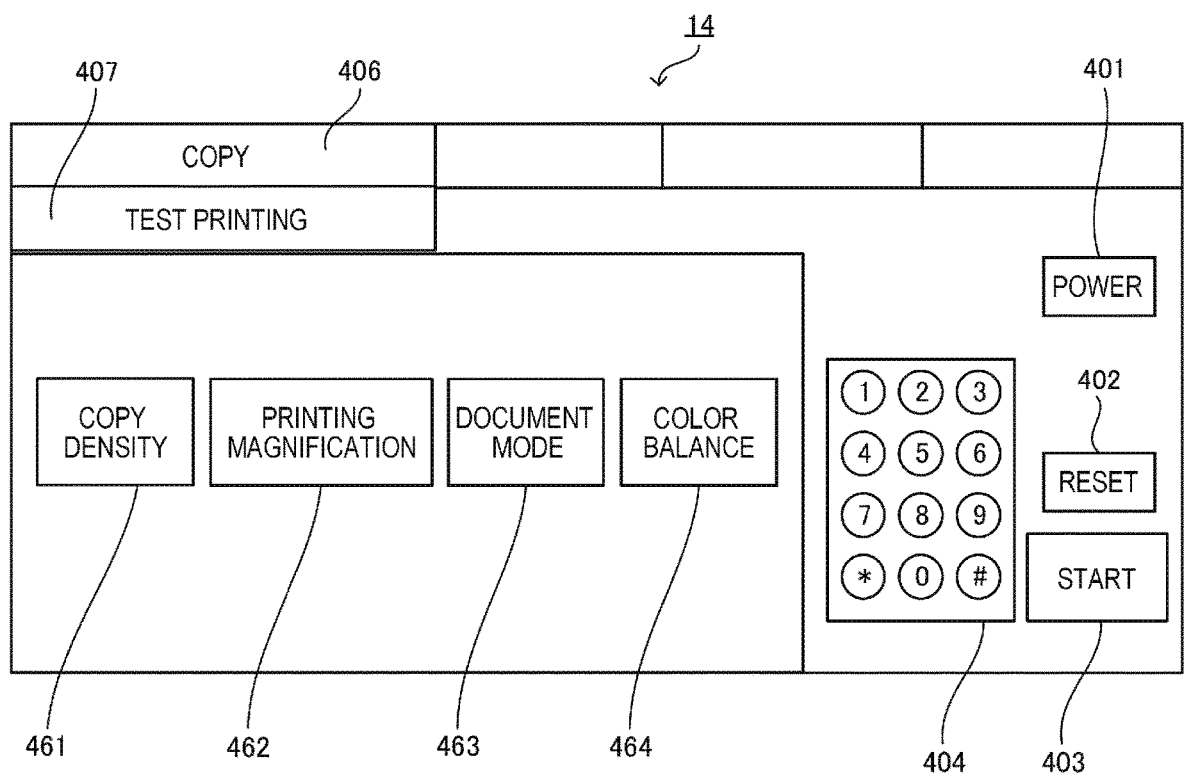

The user checks the result of test printing (ACT 19). If the user wants to change the printing conditions, the "printing condition change" key 424 is pressed. If the "printing condition change" key 424 is pressed (ACT 20: Yes), the control unit 100 displays the GUI screen illustrated in FIG. 15 on the operation panel 14. As illustrated in FIG. 15, a "copy density" key 461, a "printing magnification" key 462, a "document mode" key 463 and a "color balance" key 464 are displayed on the GUI screen.

The "copy density" key 461 is a key for selecting correction of a printing parameter corresponding to printing density. Here, the copy density is defined to have levels of 1 to 10 and an initial value is set to level 5. The "printing magnification" key 462 is a key for selecting correction of the printing parameter indicating the magnification or reduction ratio when the document is printed. The printing magnification is variable in a range of 50% to 200%, for example, with an initial value set to 100%. The "document mode" key 463 is a key for selecting whether the document is a text document or a photograph document and thus to change printing parameters according to preset modes according to document type. The initial value of document mode is set to the text document. The "color balance" key 464 is a key for selecting correction of the printing parameter indicating the color balance of printing. Color balance is, for example, defined to have levels of +3 to −3, and the initial value is set to level ±0. Color balance may be individually set for each of yellow (Y), magenta (M), cyan (C) and black (K).

Figure 16:
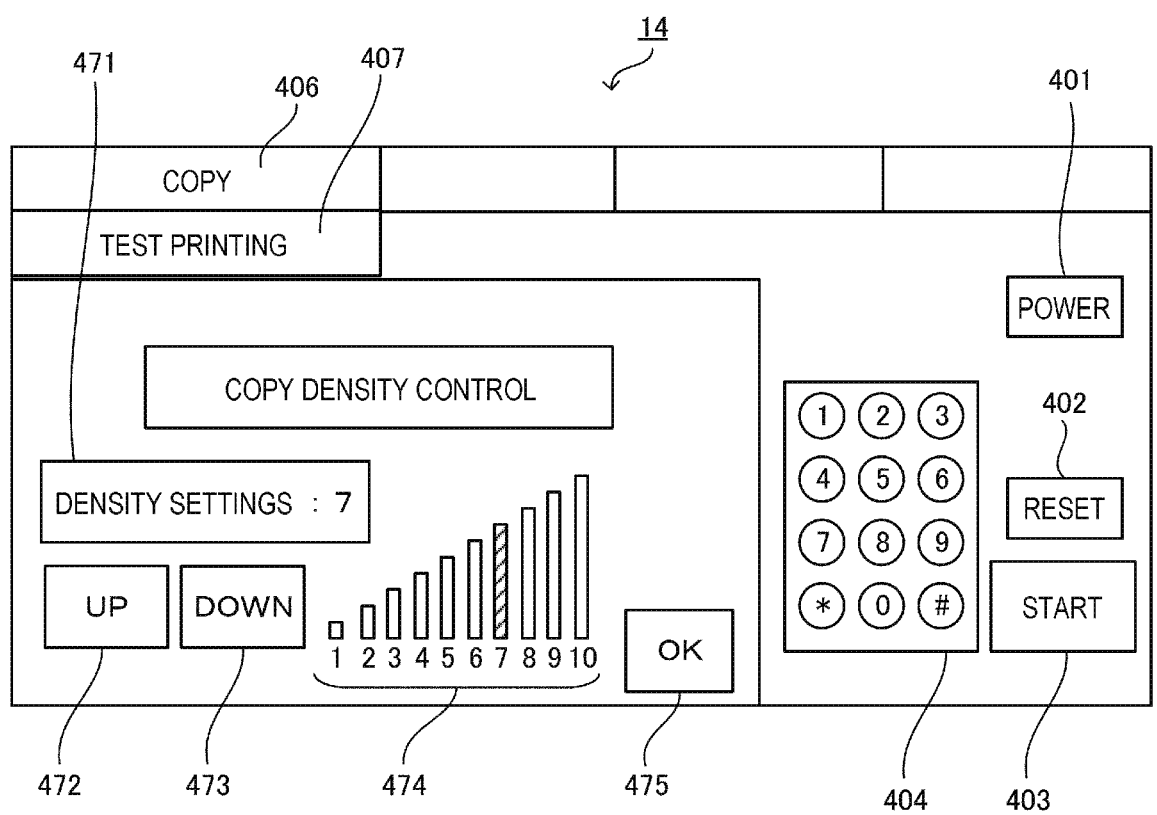

Here, the case where the "copy density" key 461 is pressed will be described in detail. When the "copy density" key 461 is pressed, the GUI screen illustrated in FIG. 16 is displayed on the operation panel 14. As illustrated in FIG. 16, a density setting display field 471, an "UP" key 472, a "DOWN" key 473, a density graph 474 and an "OK" key 475 are displayed on the GUI screen.

If the "UP" key 472 is pressed, the printing condition is changed such that the copy density is increased. If the "DOWN" key 473 is pressed, the printing condition is changed such that the copy density is decreased. The currently designated copy density is displayed in the density setting display field 471. In addition, the currently designated copy density is also displayed by shading in the density graph 474. If the "OK" key 475 is pressed, a change of the printing condition is set (ACT 21). When the "OK" key 475 is pressed, the control unit 100 displays the GUI screen illustrated in FIG. 7 on the operation panel 14.

If test printing is to be performed again (ACT 22: No), the user again selects keys illustrated in FIG. 7. The control unit 100 repeats the process of ACT 11 to ACT 22.

If the printing condition is not to be corrected (ACT 20: No), the user presses the "test printing end" key 425 illustrated in FIG. 7. When the "test printing end" key 425 is pressed (ACT 22: Yes), the control unit 100 finishes the test printing and displays the GUI screen illustrated in FIG. 2 on the operation panel 14.

Thereafter, when the user presses a printing start button 403 illustrated in FIG. 2, the control unit 100 controls the auto document feeder 13 to feed all the pages of the document to the scanner 15 and to acquire image data. The control unit 100 controls the image forming unit 17 to make the selected number of copies under the set printing conditions. For example, if the copy density is set to "7" and the number of copies of the document is set to 100, when the user presses the printing start button 403, the MFP 10 makes 100 copies of the document under the printing condition corresponding to the copy density of "7".

If a reset button 402 is pressed during the test printing processing, the control unit 100 ends the test printing and displays the GUI screen illustrated in FIG. 2 on the operation panel 14.

As described above, the image forming apparatus according to the first embodiment test-prints some pages of a document having a plurality of pages. Therefore, it is possible to shorten a time required to set the correct printing conditions since the printing conditions can be appropriately set without restarting test printing.

In addition, when test printing is performed, the control unit 100 controls the auto document feeder 13 to feed the document up to the page having the highest page number among the pages designated by the user to be test-printed. When the total number of pages of the document is large and all pages must be scanned for a test printing, it may take a considerable time to provide the result of the test printing. By stopping reading of the document at a highest page number designated for test printing, the user can more quickly acquire the result of the test printing.

In addition, the image forming apparatus according to the first embodiment has a function of displaying the GUI screen for selecting a mode for designating the page numbers of the pages to be test-printed by input of the individual page numbers and a mode for designating the page numbers of the pages to be test-printed using a page range. The user can thus make a selection permitting a check of a page including only text, a page including graphics, and a page including a photograph in a single test printing by designating appropriate page numbers of the document to be test-printed. Therefore, it is possible to reduce the need to restart or redo the test printing and to thus shorten the time required for the user to set the printing conditions appropriately for a mixed text and graphics document or the like.

In addition, the user can simplify setting operations by selecting the mode for performing the test page designation by using a page range. Even in such a mode, it is possible to appropriately set the printing conditions without restarting test printing by test-printing a plurality of pages.

In addition, the image forming apparatus according to the first embodiment has a function of displaying the GUI screen for designating a printing magnification on the operation panel 14. By printing a plurality of pages of the document on a single sheet of paper, it is possible to reduce the amount of printing paper used in the test printing.

In addition, the image forming apparatus according to the first embodiment has a function of displaying the GUI screen on the operation panel 14 for selecting whether the test printing uses one-sided printing or double-sided printing. By performing double-sided printing in this context, it is possible to reduce the amount of printing paper used for test printing.

In addition, in the above description, when test printing is performed, the auto document feeder 13 feeds the document up to the page having the highest page number among the page numbers designated by the user to be test-printed and stops the feeding of subsequent pages. However, the operation of the auto document feeder 13 is not limited thereto in all examples. For example, all the pages of the document may be fed to the scanner 15 and the scanner may store the image data of all the pages in a memory. In this case, the control unit 100 reads the image data of the pages designated for the test printing from the memory and controls the image forming unit 17 as a printing apparatus to perform test printing.

Second Embodiment

In the first embodiment, the case where the user sets the mode for test printing by designation of pages to be test-printed and a printing magnification and the like was described. However, there may be users who think manual selection of test printing settings for each document is troublesome work. In the second embodiment, a case where designation of pages to be test-printed and printing magnification are preset in advance will be described with reference to FIG. 17.

Figure 17:
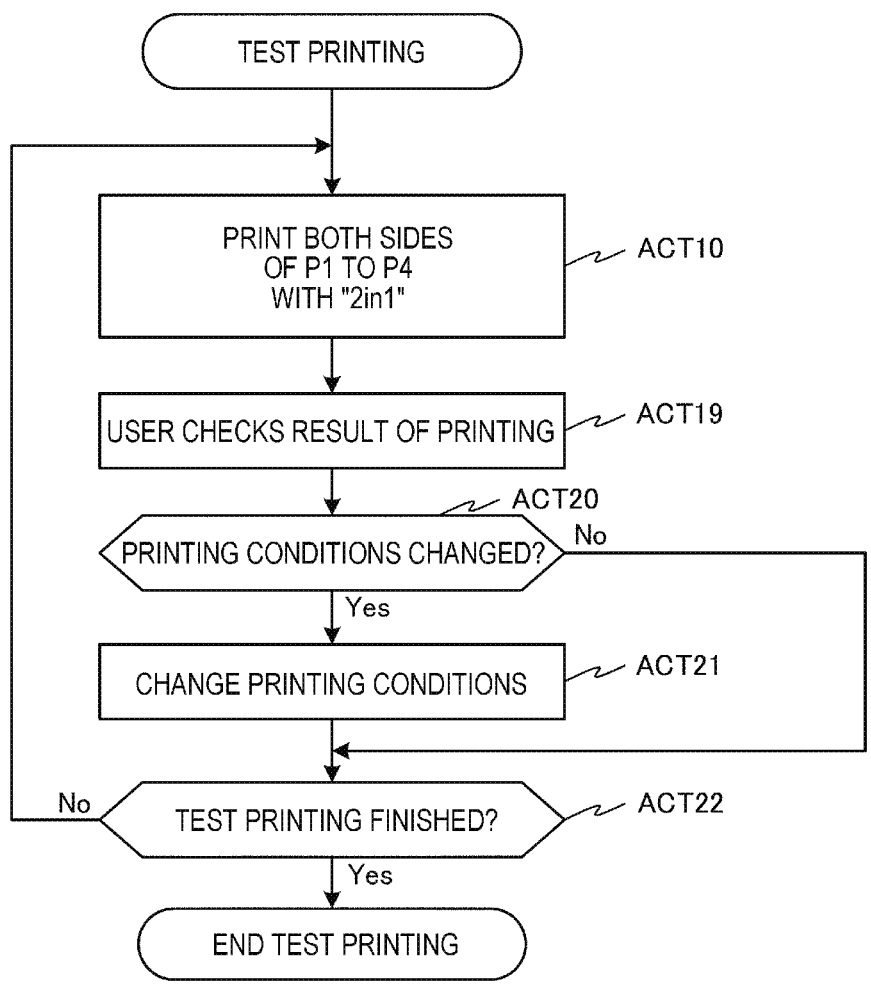
FIG. 17 is a flowchart for describing aspects of a test printing by an image forming apparatus according to a second embodiment.

In the second embodiment, if the "test printing" key 410 illustrated in FIG. 2 is pressed, the test printing process illustrated in FIG. 17 starts. When the test printing starts, the control unit 100 sets the test printing conditions to preset conditions (ACT 10). Specifically, the control unit 100 sets test printing to a "multiple-page setting" mode. In addition, the control unit 100 makes a "multiple-page designation" with a "range designation" setting. For example, the control unit 100 sets page 1 to page 4 of each document as the designated page range. In addition, the control unit 100 sets printing magnification to "2in1". In addition, the control unit 100 sets printing mode to "double-sided printing". Since the test printing mode, designation of pages, and printing magnification are automatically set, the GUI screens illustrated in FIGS. 8, 9, 10, 11 and 14 are not required to be displayed. In the test printing, page 1 and page 2 of the document are reduced to 70% and printed on the front surface of a single sheet of paper P and page 3 and page 4 are reduced to 70% and printed on the rear surface of the single sheet of paper P.

For example, assume that the total number of pages of the document 100 pages. In the above example, since the largest page number among the page numbers to be test-printed is set to page 4, the control unit 100 controls the auto document feeder 13 to feed the document only up to the fourth page of the document. The control unit 100 acquires the image data from the first to fourth pages of the document and controls the image forming unit 17 to test-print based on the image data of the corresponding fed pages to be on both sides of a single sheet of paper P by using the printing magnification of "2in1".

When test printing is finished, the control unit 100 displays the GUI screen illustrated in FIG. 7 on the operation panel 14. The processing of ACT 19 to ACT 22 is equivalent to the description for the first embodiment. The initial values for the designated range, printing magnification, double-sided/one-sided printing selection to be used in the test printing are stored in memory. In addition, the user may change these initial values according to user preference.

Third Embodiment

In the second embodiment, the case where the setting operation is simplified for the user by presetting the test printing mode, designation of pages to be test-printed and printing magnification. However, there are other methods of simplifying setting operations for the user. For example, when test printing is already set to the multiple-page designation, then the multiple-page designation is set to individual page designations, printing magnification is set to 70%, and double-sided printing are set as fixed conditions, and the user may only designate the individual pages to be test-printed.

If the "test printing" key 410 is pressed, the control unit 100 displays the GUI screen illustrated in FIG. 9 on the operation panel 14. The user then inputs "3", "#", "5", "#" etc. as the designated pages of the document to be test printed. When input of the designated pages is finished, the user presses the printing start button 403. The MFP 10 performs double-sided printing of the designated pages of the document with a "2in1" setting. If the user presses the printing start button 403 without designating any pages, the MFP 10 performs double-sided printing of page 1 to page 4 (as a default selection of pages of the document) with a "2in1" setting.

For example, assume that the number of pages of the document is 100 pages and the user designates four separate pages (that is, here the third, fifth, seventh, and ninth pages) of the document as pages to be test-printed. The highest page number among the plurality of page numbers of the pages designated by the user to be test-printed is page 9. The control unit 100 controls the auto document feeder 13 to feed the document up to its ninth page. The control unit 100 acquires the image data of the third, fifth, seventh, and ninth pages of the document and controls the image forming unit 17 to test-print image data of the corresponding pages on both sides of paper P with a printing magnification of "2in1". If the user does not designate any pages, then the control unit 100 controls the auto document feeder 13 to feed the document up to the fourth page of the document (according to a default selection of pages).

Fourth Embodiment

The MFP 10 according to the fourth embodiment sets the test printing conditions such that only one sheet of paper P is used for test printing and printing magnification is set to be as close to 100% as possible in view of the number of designated pages. Specifically, the MFP 10 selects "2in1", "4in1" or the like such that only one sheet of paper P is used for test printing. If the total number of pages of the document is two or more, then MFP 10 selects "double-sided printing". For example, if the number of designated pages for test printing is two, the MFP 10 sets printing magnification to 100% and performs double-sided printing as a test printing. When the number of designated pages of test printing is four, the MFP 10 sets "2in1" and performs double-sided printing as test printing.

For example, assume that the total number of pages of the document is 100 and the page numbers of the pages designated by the user to be test-printed are page 5 and page 9. The control unit 100 controls the auto document feeder 13 to feed the document up to the ninth page. The control unit 100 acquires the image data of the fifth and the ninth page of the document and controls the image forming unit 17 to test-print the images of the fifth and ninth pages of the document on the two sides of a single sheet of paper P at printing magnification of 100%.

The image forming apparatus according to the fourth embodiment has a function of printing the pages designated to be test-printed on both sides a single sheet of paper. Therefore, it is possible to reduce the amount of printing paper used for test printing.

Fifth Embodiment

The MFP 10 according to the fifth embodiment has a function of setting the number of sheets of paper P to be used for test printing to 1 and then upon the pressing of the test printing 410 button, the test printing process is performed under the same printing conditions as an actual printing after the user sets a printing setting from the GUI screen illustrated in FIG. 2. For example, when printing magnification is "2in1" for actual printing, the MFP 10 also sets printing magnification for test printing to "2in1". In such a case, it is possible to test-print two or four individual pages of document depending on whether the printing condition is for one-sided printing or double-sided printing since the number of sheets of paper P to be used for test printing has been limited to 1. When test printing is performed, even if the total number of sheets of document placed on the auto document feeder 13 is four or more (e.g., ten), the auto document feeder 13 stops after the designated two or four pages of document have been conveyed.

In addition, when printing magnification of the actual printing is "4in1", the MFP 10 sets printing magnification of test printing to "4in1". In this case, since the number of sheets of paper P used for test printing is limited to 1, it is possible to test-print four or eight individual pages of document depending on whether the printing condition is set to be one-sided printing or double-sided printing. As in the case of "2in1" actual print setting, the only those sheets of document required for test printing the designated pages on one sheet of paper P according to the printing conditions are fed through the ADF 13 by the test printing instruction and test printing can be performed without scanning every page of the document.

If the test printing end button 425 is pressed to finish test printing and any remaining pages of the document which have not been conveyed by the auto document feeder 13 are present, a screen for checking whether the remaining document is to be printed under the same conditions as the test printing may be displayed on the GUI and printing may be continuously performed according to the input from the user on this screen display. Alternatively, a request for removal of the remaining pages of the document may be displayed on the GUI and the user may be prompted to reset the document to be actually printed in the auto document feeder 13 again.

In addition, the above-described GUI screens are exemplary and the present disclosure is not limited thereto. In addition, the printing parameters are also exemplary and the present disclosure is not limited thereto. In addition, the flowchart illustrated in FIG. 6 is exemplary and the present disclosure is not limited thereto. For example, the flowchart may be considered to depict a process of transitioning to a subroutine for each key pressed on each GUI screen illustrated. In addition, a timer may be provided, and the GUI screen may be changed when a predetermined time has elapsed. In addition, a key for extending a time until the GUI screen is changed may be provided. In addition, a "confirm" key may be provided on each GUI screen and a next GUI screen may be displayed using the pressing of the "confirm" key as a trigger.

In addition, although the case of displaying the GUI screen on the operation panel 14 of the MFP 10 is described in the above description, the display of the GUI screen is not limited to the operation panel 14. For example, when a personal computer is used to remotely control the MFP 10, a screen of the personal computer may be used as a user interface to display a GUI screen or the like in the same manner otherwise depicted as being on operation panel 14. Specifically, an above-described GUI screen can be displayed on a liquid crystal screen of a personal computer or the like by application software installed in the personal computer or the like. Such a personal computer or the like then supplies conditions input by the user via the GUI screen to the input/output control circuit 123 of the MFP 10. The control unit 100 performs test printing based on the conditions acquired via the input/output control circuit 123.

In the above example embodiments, the case where the image forming apparatus 10 is a multifunctional peripheral was described. The present disclosure is not limited thereto and the image forming apparatus 10 may be a laser printer or the like.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
   a document feeder configured to feed a document page by page;
   a scanner configured to scan the document fed by the document feeder page by page and generate image data of the document;
   a printing apparatus configured to print images on recording media based on the image data generated by the scanner;
   an interface configured to receive a designation of non-consecutive pages of the document; and
   a controller configured to:
   control the document feeder to feed pages of the document,
   acquire image data of the pages of the document fed by the document feeder, and
   control the printing apparatus to print images of the designated non-consecutive pages of the document scanned by the scanner, the images comprising image data of the pages of the document fed by the document feeder.

2. The image forming apparatus according to claim 1, wherein the controller is configured to control the document feeder to feed pages of the document only up to a highest page number among the designated non-consecutive pages of the document.

3. The image forming apparatus according to claim 1, wherein
   the interface is further configured to receive print settings,
   the printing apparatus prints images on the recording media according to the received print settings,
   the print settings include a copy density setting and a color balance setting, and
   the controller controls the printing apparatus to print according to the received print settings when printing images based on the image data.

4. The image forming apparatus according to claim 3, further comprising:
   a first memory for storing initial values for the printing settings, and
   the controller controls the printing apparatus to print according to the initial values for print settings if different print setting values are not received via the interface.

5. The image forming apparatus according to claim 4, wherein the interface comprises an operation panel via which a user can provide print settings values.

6. The image forming apparatus according to claim 1, wherein the interface is a graphical user interface displayed on a display screen.

7. An image forming apparatus, comprising:
   a document feeder configured to feed a document page by page;
   a scanner configured to scan pages of the document fed by the feeder and generate image data of the pages;
   a printing apparatus configured to print an image on a sheet based on the image data of the pages of the document scanned by the scanner;
   a user interface configured to receive a user designation of a plurality of non-consecutive page numbers of the pages of the document, the plurality of non-consecutive page numbers corresponding to a selection of pages of the document; and
   a controller configured to control the printing apparatus to print images corresponding to the image data of the selection of pages of the document.

8. The image forming apparatus according to claim 7, wherein
   the user interface is a graphical user interface (GUI) displayed on an operation panel, the controller is configured to display a screen for instructing a printing via the GUI, and when the printing is instructed, the controller is configured to display, via the GUI, a screen to select:
- a mode in which the printing includes all pages of the document,
- a mode in which the printing includes a single designated page of the document, and
- a mode in which the printing includes a plurality of designated pages of the document.

9. The image forming apparatus according to claim 8, wherein the controller displays, via the GUI, a screen to designate a plurality of pages to be printed.

10. The image forming apparatus according to claim 9, wherein the screen permits a designation by individual page numbers.

11. The image forming apparatus according to claim 10, wherein the screen further permits a designation by a page number range.

12. The image forming apparatus according to claim 8, wherein the controller displays, via the GUI, a screen for designating a printing magnification.

13. The image forming apparatus according to claim 8, wherein the controller displays, via the GUI, a screen for selecting whether printing is a one-sided printing or a double-sided printing.

14. The image forming apparatus according to claim 7, further comprising:
a storage device, wherein
the scanner is configured to store the generated image data in the storage device, and
the controller is configured to acquire the image data for the selection of pages from the storage device.

15. The image forming apparatus according to claim 7, wherein the controller is configured to control the document feeder to feed pages of the document only up to a highest page number in the plurality of non-consecutive page numbers received via the user interface.

16. The image forming apparatus according to claim 7, wherein the controller is configured to control the document feeder to feed all pages of the document before the plurality of non-consecutive page numbers is received via the user interface.

17. A printing method for an image forming apparatus, the method comprising:
receiving a user designation of a plurality of non-consecutive page numbers of a document that includes a plurality of pages;
controlling a document feeder to feed pages of the document to a scanner according to the user designation of the plurality of non-consecutive page numbers of the document;
acquiring image data from a plurality of non-consecutive pages of the document corresponding to the user designation of non-consecutive page numbers as fed by the document feeder to the scanner; and
controlling a printing apparatus to print an image based on the acquired image data.

18. The method according to claim 17, wherein the document feeder is controlled to only feed pages of the document to the scanner up to the highest page number in the user designation of non-consecutive page numbers.

19. The method according to claim 18, wherein the designation of non-consecutive page numbers is received from a user via a graphical user interface.

20. The method according to claim 18, wherein the designation of non-consecutive page numbers includes a page number range.

* * * * *